Oct. 13, 1925.

P. B. LASKEY 1,556,617

POROUS CANDY AND METHOD OF AND APPARATUS FOR MAKING IT

Filed May 17, 1923

Inventor:
Philip B. Laskey
by Heard, Smith & Tennant
Attys.

Oct. 13, 1925.

P. B. LASKEY 1,556,617

POROUS CANDY AND METHOD OF AND APPARATUS FOR MAKING IT

Filed May 17, 1923  2 Sheets-Sheet 2

Inventor.
Philip B. Laskey
by Heard Smith & Tennant.
Attys.

Patented Oct. 13, 1925.

1,556,617

UNITED STATES PATENT OFFICE.

PHILIP B. LASKEY, OF MARBLEHEAD, MASSACHUSETTS, ASSIGNOR TO THE CHOCOLATE SPONGE CO., INC., OF NEW YORK, N. Y., A CORPORATION OF NEW YORK.

POROUS CANDY AND METHOD OF AND APPARATUS FOR MAKING IT.

Application filed May 17, 1923. Serial No. 639,520.

*To all whom it may concern:*

Be it known that I, PHILIP B. LASKEY, a citizen of the United States, and resident of Marblehead, county of Essex, State of Massachusetts, have invented an Improvement in Porous Candy and Methods of and Apparatus for Making It, of which the following description, in connection with the accompanying drawing, is a specification, like characters on the drawing representing like parts.

This invention relates to the making of porous candy of that type having holes or passages extending longitudinally thereof from end to end.

In my co-pending application Serial No. 579,002, filed August 1st, 1922, I have illustrated and described a method of making candy of this type which consists in forming simultaneously a plurality of separate candy tubes in spaced parallel relation and then expanding said tubes radially so as to cause the walls of adjacent tubes to contact with and adhere to each other. This is accomplished by forcing the candy through a die having a plurality of annular openings thereby to make the separate candy tubes and then by admitting compressed air into each candy tube to cause it to expand radially into contact with the adjacent tube.

In order to facilitate the forcing of the candy material through the die the latter is made so that the tubular structure issuing from the die has a much greater lateral dimension than desired for the finished candy and each candy tube or cell is much larger than desired in the final structure, and after the tubular structure has thus been formed it is drawn longitudinally to reduce it to the desired dimension, the cellular structure being maintained during the drawing operation by introducing air under pressure into the tubes or cells.

In the candy made by the above-mentioned process the separate tubular elements of the candy structure are held together simply by the adhesion resulting from bringing two candy tubes into contact when they are in a tacky condition.

In my present invention I have provided an improved method of making this kind of candy by which the separate candy tubes are integrally connected by connecting fins so that the tubes are held in their spaced relation not simply by adhesion as is the case in the prior application but are integrally united by the connecting fins.

In carrying out my present method I first form separate candy tubes in spaced relation and then form on each tube and integral therewith a projecting fin or web which is integrally united to a similar projecting fin or web formed on an adjacent tube thereby to form the candy structure in which the separate candy tubes are integrally united by the connecting fins.

This structure is formed by forcing the candy material through a die as described in my co-pending application and the die is specially constructed so as to produce candy material having the separate tubes integrally connected by the fins. The tubular candy structure which is delivered from the die is considerably larger in transverse dimension than that desired for the completed product and after the candy structure is delivered from the die it is then drawn so as to reduce it to the required smaller dimension.

In order to give an understanding of the invention I have illustrated in the drawings an apparatus embodying the invention and by which the process may be carried out.

Figure 5:
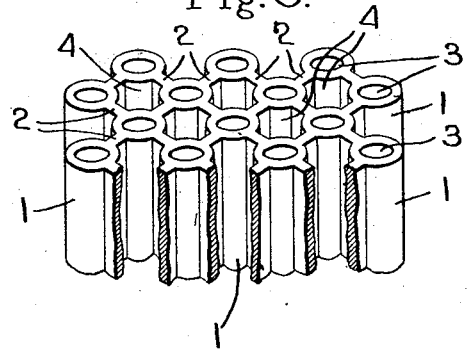
Fig. 5 is a fragmentary perspective view showing the candy structure produced.

As stated above the candy structure which is produced by this invention comprises a plurality of separate tubes which are integrally united by connecting fins extending longitudinally of the tubes. Figure 5 illustrates such a candy structure, 1 indicating the separate tubes of candy and 2 indicating the connecting fins or webs by which adjacent tubes are integrally united. It will be observed that each tube 1, except those on the outside of the candy structure, is integrally connected by a web 2 to each of four surrounding candy tubes. Such a structure makes an integral candy structure having the cylindrical pores or openings 3 within the tubes 1 and the more or less square openings 4 between the tubes 1.

Figure 1:
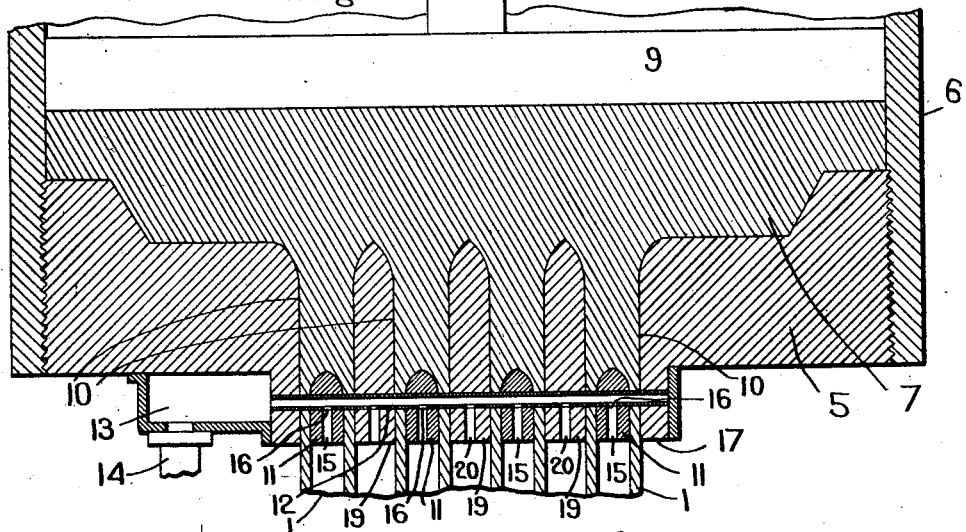
Fig. 1 is a vertical sectional view through a die by which my improved method may be carried out, said section being taken on substantially the line 1—1, Fig. 2.
Figure 2:
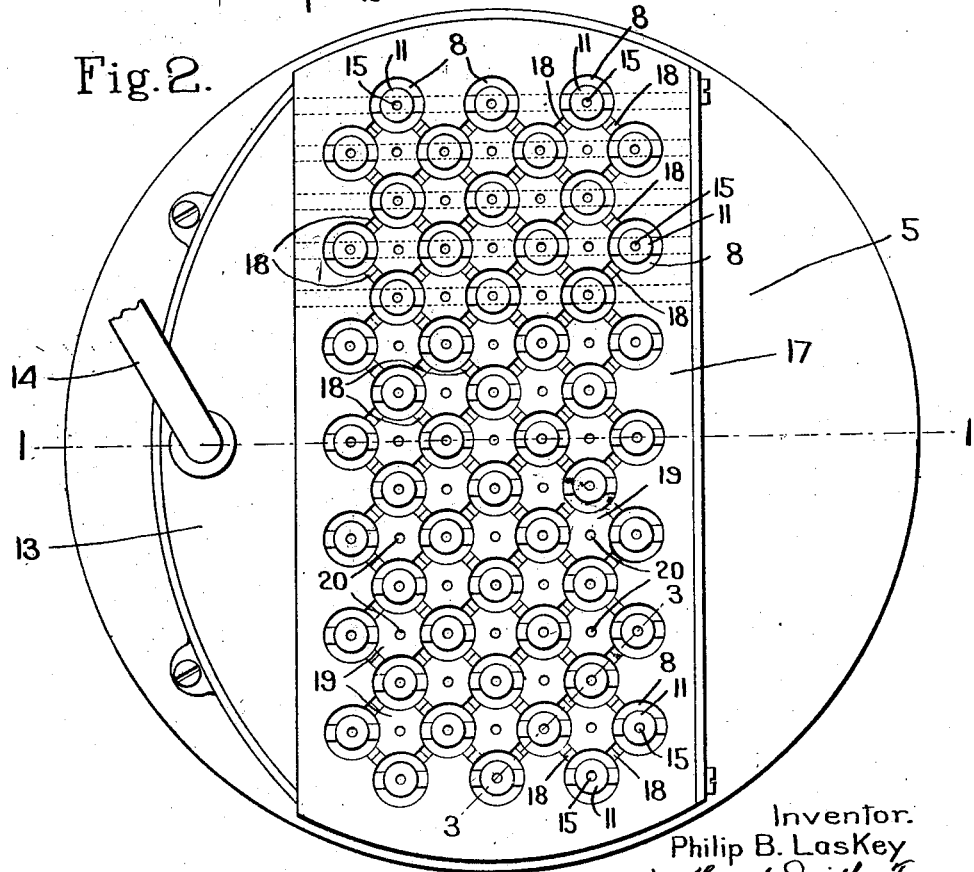
Fig. 2 is a bottom plan view of Fig. 1.
Figure 3:
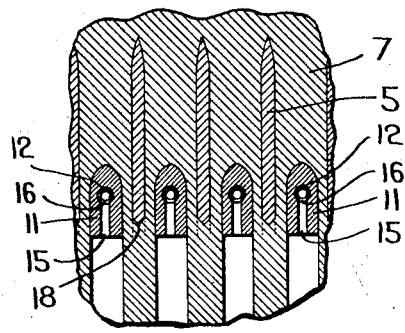
Fig. 3 is a fragmentary sectional view on the line 3—3, Fig. 1.
Figure 4:
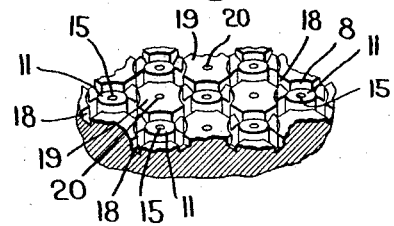
Fig. 4 is a fragmentary perspective view of the face of the die.

This structure is formed by forcing the candy material through a die which is indicated generally at 5, said die being shown in Fig. 1 as forming the lower end of a container 6 in which candy material 7 is placed. This die 5 is provided with a plurality of annular openings 8 through which the candy material 7 is forced by any suitable means, such for instance as a plunger 9. These annular openings 8 will be preferably made of a transverse dimension considerably greater than the desired thickness of the walls of the separate tubes in the finished piece of candy and after the tubular candy structure emerges from the die it is drawn longitudinally to reduce it to the desired final dimension, during which operation the walls of the tube are reduced in thickness all as usual in candy-making operations.

The annular openings 8 are made in the usual way by forming holes 10 through the die 5 and then supporting a core 11 within each aperture 10. These cores are shown as supported on tubes 12 extending transversely of the die. The cores 11 form the annular openings 8 which produce the candy tubes 1.

The fins 2 which integrally unite the candy tubes 1 are formed while the candy material is being forced through the die so that when the candy structure emerges from the die the tubes 1 are integrally connected by the fins 2. For this purpose the face 17 of the die is provided with grooves 18 connecting the annular openings 8. As the candy material is forced through the openings 10 and around the cores 11 thereby to produce the tubular shapes 1 such candy material will flow into the grooves 18 thereby forming the fins 2. Each groove 18 will be filled from candy forced into it from each end and this candy material will integrally unite in the groove and thus form an integral fin connecting two adjacent tubes 1. When, therefore, the candy material emerges from the face of the die 1 it is an integral structure such as shown in Fig. 5 comprising tubular elements 1 that are integrally connected by connecting fins 2.

As stated above the die is made so that the candy structure which is delivered from it is of considerably larger transverse dimension and the walls of the cellular structure are considerably thicker than that desired in the completed candy. As the candy emerges from the die it is drawn longitudinally to reduce it to the desired size and during this drawing operation the cellular structure is maintained by introducing air into the openings 3 and 4. This is done in the usual way by providing the cores 11 with the ducts 15 which communicate through ports 16 with the interior of the tubes 12, the latter communicating with the manifold 13 which is supplied with compressed air through a suitable pipe 14.

The portions 19 of the die between the annular openings 8 is also provided with ducts 20 which communicate with the tubes 12 and thus compressed air is delivered to the cells of the cellular candy structure as it is made.

A candy structure in which the tubular portions are integrally united by webs or fins has the advantage that there is no danger of the individual tubes separating from each other because of their integral union. Such a candy can be freely handled and shipped without danger of its crushing or breaking.

I claim:

1. A pulled candy structure comprising expanded and pulled tubular elements integrally connected by expanded and pulled connecting webs.

2. The method of making a porous candy which consists in forming a plurality of expanded candy tubes in spaced relation with adjacent expanded tubes integrally united by connecting fins, drawing the cellular structure thus made and maintaining its cellular shape by introducing air into the cells or pores.

3. The method of forming a porous candy which consists in forming a plurality of candy tubes in spaced relation each having a projecting fin and then expanding and integrally uniting the fins to form an integral cellular candy structure.

4. The process of making porous candy which consists in forming a plurality of candy tubes in spaced relation and then expanding and integrally uniting said tubes with connecting fins.

5. An apparatus for making candy comprising a die having a plurality of separate annular openings which are connected on the delivery face of the die by grooves formed in said face, and means to force candy material through said annular openings.

In testimony whereof, I have signed my name to this specification.

PHILIP B. LASKEY.